United States Patent [19]
Eckerdt

[11] 3,817,494
[45] June 18, 1974

[54] DRUM DRIVE

[75] Inventor: George H. Eckerdt, Rochester, N.Y.

[73] Assignee: Korton Sciences Incorporated, Rochester, N.Y.

[22] Filed: Feb. 22, 1973

[21] Appl. No.: 334,669

[52] U.S. Cl. ............................................. 254/187
[51] Int. Cl. ............................................ B66d 1/20
[58] Field of Search ............... 254/187, 185, 185 B; 192/107 M; 64/30 R

[56] References Cited
UNITED STATES PATENTS

| | | | |
|---|---|---|---|
| 730,940 | 6/1903 | Martin | 254/187 |
| 989,777 | 4/1911 | Green | 254/187 |
| 2,596,203 | 5/1952 | Bridwell | 254/187 |
| 3,617,426 | 11/1971 | Grundman | 192/107 M X |

FOREIGN PATENTS OR APPLICATIONS

| | | | |
|---|---|---|---|
| 244,073 | 3/1963 | Australia | 254/187 |

Primary Examiner—Stanley H. Tollberg
Assistant Examiner—John P. Shannon
Attorney, Agent, or Firm—Campston, Shaw & Stephens

[57] ABSTRACT

A windlass drum drive uses a drum axially and rotatably movable on an axially movable shaft with two-part, rotationally oriented fiber units arranged on each end of a drum. A fiber drive unit engages between the shaft and the drum for winding in the windlass, and a fiber brake unit engages between the drum and a fixed surface for braking the drum in any stopped position. Axial movement of the shaft releases both fiber units to let the windlass pay out, and a spring biases the shaft toward engaging both fiber units for winding in and braking.

12 Claims, 3 Drawing Figures

PATENTED JUN 18 1974 3,817,494

ન,817,494

DRUM DRIVE

THE INVENTIVE IMPROVEMENT

Drum drives are used for many purposes including windlass drums, both powered and manual. Various combinations of driving torques, free pay-out, and braking are required in drum drives both independently and cooperatively with the power input. The invention involves recognition of a simpler and better way to arrange a drum drive for accomplishing such purposes, and the invention seeks economy, reliability, safety, and long life in a drum drive performing all the desired functions.

SUMMARY OF THE INVENTION

The inventive drum drive includes a shaft, a drum supported on the shaft for axial and rotational motion, and means for rotating the shaft. A two-part rotationally-oriented, engagable and disengagable fiber unit has one part rotationally fixed to the shaft and the other part rotationally fixed to the drum in an orientation for driving the drum rotationally with the shaft in one direction and to slip when the shaft rotates in the opposite direction. Another two-part, rotationally oriented, engagable and disengagable fiber unit has one part rotationally fixed to a fixed surface and the other part rotationally fixed to the drum in an orientation opposite to the drive unit for braking the drum rotationally relative to the fixed surface. Bias means urges the drive unit and brake unit into engagement, and the bias means can be overcome to disengage the drive unit and brake unit. The result is a drum that among other things can be released for free pay-out, can be wound in with the drive unit engaged and will lock against pay-out with the brake unit engaged.

DRAWINGS

DETAILED DESCRIPTION

Figure 1:
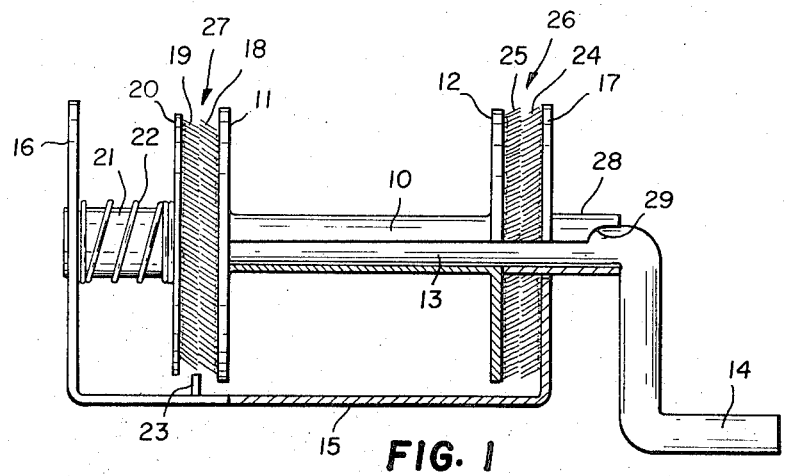
FIG. 1 is a partially-schematic, partially cut-away elevational view of a preferred embodiment of the inventive drum drive.

The drum drive shown somewhat schematically in the drawings is applied to a drum 10 which can serve as a windlass or be used for other drum purposes. It is shown as manually operated, but can also be power driven. It can be made in many sizes and shapes for many different purposes, but as illustrated it includes flanges 11 and 12 and is mounted on support shaft 13 which is operated by crank 14. A base 15 has upstanding supports 16 and 17 through which shaft 13 passes for supporting drum 10.

The inventive drum drive uses rotationally oriented, engagable and disengagable fiber units described in more detail below. Such fiber units are sometimes called drive facings and are presently available from the 3M Company under the brand name FIBRETRAN. Generally, they comprise a base material having oriented nylon fibers that are uniformly angled to form a multitude of driving bristles that can make a frictional or bracing engagement with another surface. Such fiber units can be purchased as rings having fibers angled from the vertical and oriented around the rings in either a clockwise or counterclockwise disposition as desired. Fiber units are also available in linear form with fibers all inclined in the same direction throughout a piece of material.

Such fiber units are often used to engage a roughened or irregular surface such as a screen or a knurled or ridged surface. When the fibers are angled from the vertical they can slip in one direction relative to the surface they engage and brace or grip in the opposite direction. Pairs of oriented fiber units can also engage each other, and this is preferred in the illustrated embodiment of the invention.

The preferred fiber units have a long slip life when driven in the slip direction, and they are also substantially unaffected by water, oil, dirt, sand, and other materials hostile to other drive units. They also automatically accommodate small misalignments and manufacturing tolerances. The gripping force of such fiber units is related to the fibrous area, and if the fiber units are made large enough, they make very powerful grippers. At the same time they slip fairly easily relative to the gripping surface. Hence, as applied to the inventive drum drive, fiber units can be arranged either to grip each other or some other irregular surface and can be made in any size necessary to provide the desired gripping force, because most drum drives involve forces that are well within the gripping capacity of the preferred fiber units.

As applied to drum 10, one-half 18 of a rotationally oriented fiber unit 27 is secured to flange 11, and the other half 19 is secured to a confronting flange 20 carried on a sleeve 21 surrounding and fixed to shaft 13. Fiber rings 18 and 19 form two parts of a fiber drive unit 27 that is oriented for driving drum 10 rotationally with shaft 13 in a desired direction for winding in on drum 10. To accomplish this, fiber units 18 and 19 preferably each have the same orientation so that their fibers generally align with one another as they engage. The fibers then interlock in a strong engagement when flange 20 approaches flange 11. As illustrated in the drawings, fiber rings 18 and 19 each have a counter-clockwise rotational orientation so as to engage and drive when crank 14 is turned counterclockwise as viewed from the right end of FIG. 1.

Shaft 13 is axially movable between supports 16 and 17, and spring 22 is compressed between support 16 and flange 20 for biasing shaft 13 fully to the right as illustrated in FIG. 1. This urges flange 20 toward flange 11 and normally holds fiber rings 18 and 19 in engagement. If shaft 13 is moved leftward by pushing on crank 14, flange 11 engages a projection 23 that limits the leftward movement of drum 10, and then shaft 13 can move further leftward to separate flange 20 from flange 11 and disengage drive unit 27.

A brake fiber unit 26 is formed by fiber ring 24 secured to fixed support 17 and fiber ring 25 secured to flange 12 of drum 10. The fiber orientation of rings 24 and 25 is opposite to the orientation of rings 18 and 19 and is clockwise as shown in the drawings. This lets fiber units 24 and 25 slip together as shaft 13 turns counterclockwise for winding in on drum 10, and the generally aligned fibers of rings 24 and 25 interlock with each other to serve as a brake resisting any payout or clockwise rotation of drum 10. Brake unit 26 can be released by moving shaft 13 axially leftward against spring 22, and a sleeve 28 surrounds shaft 13 between crank 14 and flange 12 to push flange 12 away from flange 17 as shaft 13 moves leftward. Sleeve 28 has a notch 29 that can receive crank 14 so that sleeve 28 has two axial positions on shaft 13.

With drum 10 in the normal position shown in FIG. 1, crank 14 can be turned counterclockwise as viewed from the right end of the device for rotating drive unit 27 to turn drum 10 counterclockwise with shaft 13 for winding in on drum 10. Rings 24 and 25 of brake unit 26 slip together as drum 10 is driven counterclockwise for winding in, and any time such cranking stops, brake 26 engages to hold drum 10 against any counter force tending to rotate it clockwise. Also, instead of circular counterclockwise motion, crank 14 can be operated reciprocally to wind in drum 10 a rotational increment for each counterclockwise arc of crank 14, and as crank 14 moves clockwise, disks 18 and 19 of drive unit 27 slip together while brake 26 holds drum 10 against any payout.

Figure 2:
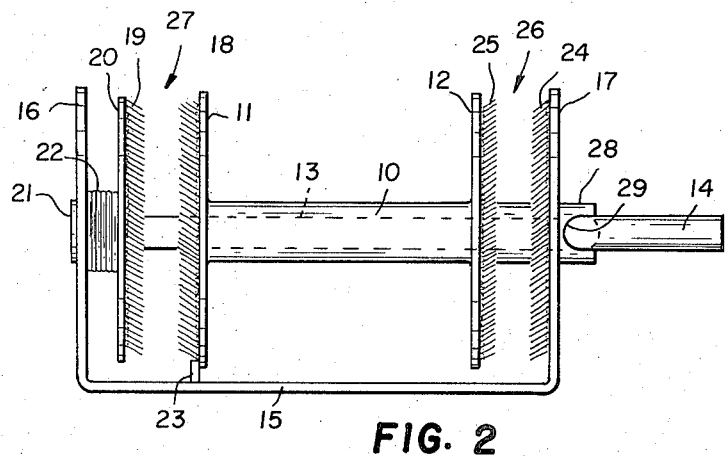
FIG. 2 shows the drum drive of FIG. 1 with both the drive unit and brake unit released.

With crank 14 in notch 29 and shaft 13 moved fully leftward as illustrated in FIG. 2, flange 11 engages projection 23 to limit the leftward movement of drum 10 and allow shaft 13 to move further leftward for separating flange 20 from flange 11 and disengaging drive unit 27. Also, sleeve 28 engages flange 12 as shaft 13 moves leftward to separate flange 12 from support 17 to disengage brake 26. This releases drum 10 from both drive unit 27 and brake unit 26 so that drum 10 can spin freely on shaft 13 for a free payout as desired. Preferably sleeve 28 is dimensioned relative to projection 23 so that brake unit 26 releases slightly after release of drive unit 27. Then, by axial adjustment of crank 14, brake 26 can be feathered or adjusted frictionally to let the payout of drum 10 proceed at any desired rate. Any time crank 14 is released, spring 22 quickly drives shaft 13 to the right to push flange 20 against drum flange 11 and move drum 10 to the right to engage brake unit 26 and stop any further payout. Hence, the drum drive stops any time crank 14 is released—whether in winding in or paying out.

Figure 3:
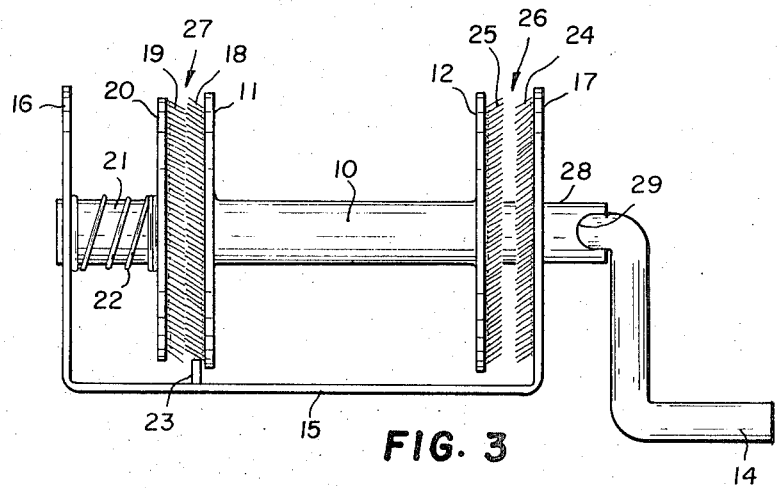
FIG. 3 shows the drum drive of FIG. 1 with only the brake unit released.

With crank 14 out of notch 29 as shown in FIG. 3, crank 14 can be moved leftward to press sleeve 28 against flange 12 to release brake unit 26 before drive unit 27 releases. This occurs because drum 10 can move leftward a small amount before its left flange 11 engages projection 23. Brake unit 26 tends to remain engaged until flange 12 is pushed away from flange 17 so that drive unit 27 normally disengages before brake unit 26. However, with crank 14 out of notch 29 as shown in FIG. 3, sleeve 28 pushes against flange 12 immediately as crank 14 moves leftward, and before flange 11 engages projection 23. This disengages brake unit 26 before drive unit 27 disengages, and if shaft 13 is held in such position, brake 26 is released, and payout of drum 20 will occur only if crank 14 is turned clockwise to rotate shaft 13 with drum 0 through the engagement of drive unit 27.

The inventive drum drive can also be power driven and many arrangements are possible for moving the drum-supporting shaft axially to accomplish the desired engagement and disengagement of the drive and braking units. The size of these and the surfaces they engage can be adapted to the forces encountered by the drum depending on the circumstances of its use.

One use intended for the inventive drum drive is for an anchor windlass for a boat, and for a windlass to move a boat on and off its trailer. The invention has many advantages in such an environment because of its simplicity, economy, and reliability and because the fiber drive units are impervious to water, oil, sand, and other foreign matter encountered around boats. Also, the inventive drive has a minimum of moving parts to accomplish its desired functions and has more than adequate gripping force for its anticipated uses, and it is safe in stopping whenever its crank is released.

Fiber units used in the inventive drum drive need not be circular disks and need not extend full circle around the drive. For example, a patch of fiber material oriented rotationally or linearly could be positioned to engage a screen or other irregular surface including a ring of oriented fibers. The forces to be encountered generally determine the size and type of engagement of fiber units for the drive. The inventive drum drive can also be used in many other circumstances where drums need to be turned, braked and paid out, and many of these uses would benefit from the simplicity, economy and reliability of the fiber units used in the drive.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example those skilled in the art will understand the application of the invention to many drum drives for many different purposes.

I claim:

1. A drum drive comprising:
  a. a shaft;
  b. a drum supported on said shaft for axial and rotational movement relative to said shaft;
  c. means for rotating said shaft;
  d. a two-part, rotationally oriented, engagable and disengagable fiber unit having one part rotationally fixed to said drum in an orientation for driving said drum rotationally with said shaft in one direction and for slipping when said shaft rotates in the opposite direction;
  e. another two-part, rotationally-oriented, engagable and disengagable fiber unit having one part rotationally fixed to a fixed surface and the other part rotationally fixed to said drum in an orientation for braking said drum rotationally relative to said fixed surface to resist rotational force on said drum in said opposite rotational direction and for slipping when said drum rotates in said one direction;
  f. means for biasing said drive unit and said brake unit into engagement; and
  g. means for overcoming said bias means to disengage said drive unit and said brake unit.

2. The drum drive of claim 1 wherein said drive unit comprises an opposing pair of rotationally oriented fiber rings respectively related to grip together when said shaft rotates in said one rotational direction and to slip when said shaft rotates in said opposite rotational direction.

3. The drum drive of claim 2 wherein said brake unit comprises an opposing pair of rotationally oriented fiber rings respectively related to grip together when said drum is urged in said opposite rotational direction and to slip when said drum turns in said one rotational direction.

4. The drum drive of claim 1 including means for moving said shaft axially relative to said fixed surface, means for limiting the axial movement of said drum relative to said fixed surface so said shaft is movable a greater axial distance than said drum, and said bias means comprises a spring biasing said shaft axially.

5. The drum drive of claim 4 wherein a crank on said shaft is included in said means for rotating said shaft and said means for moving said shaft axially.

6. The drum drive of claim 4 wherein said fixed surface includes a pair of supports straddling said drum with said shaft passing through said supports; said spring is compressed between one of said supports and said drive unit part secured to said shaft; said one brake unit part is secured to the other of said supports; and said drum is biased axially by said drive unit part secured to said shaft to engage said drum with said one brake unit part.

7. The drum drive of claim 6 wherein said means for limiting axial movement of said drum is a projection extending from said fixed surface to engage said drum.

8. The drum drive of claim 6 wherein a crank on said shaft is included in said means for rotating said shaft and said means for moving said shaft axially, and including a sleeve around said shaft between said crank and said drum for engaging said drum to move said drum axially with said shaft to disengage said brake unit.

9. The drum drive of claim 8 wherein said means for limiting axial movement of said drum is a projection extending from said fixed surface to engage said drum.

10. The drum drive of claim 8 wherein said sleeve has a notch shaped to receive said crank so said sleeve has two axial positions of engagement with said crank to allow disengagement of said brake unit without disengaging said drive unit when said crank is not in said notch and disengagement of both said drive unit and said brake unit when said crank is in said notch.

11. The drum drive of claim 5 wherein said drive unit comprises an opposing pair of rotationally oriented fiber rings respectively related to grip together when said shaft rotates in said one rotational direction and to slip when said shaft rotates in said opposite rotational direction.

12. The drum drive of claim 11 wherein said brake unit comprises an opposing pair of rotationally oriented fiber rings respectively related to grip together when said drum is urged in said opposite rotational direction and to slip when said drum turns in said one rotational direction.

* * * * *